Figure 1:
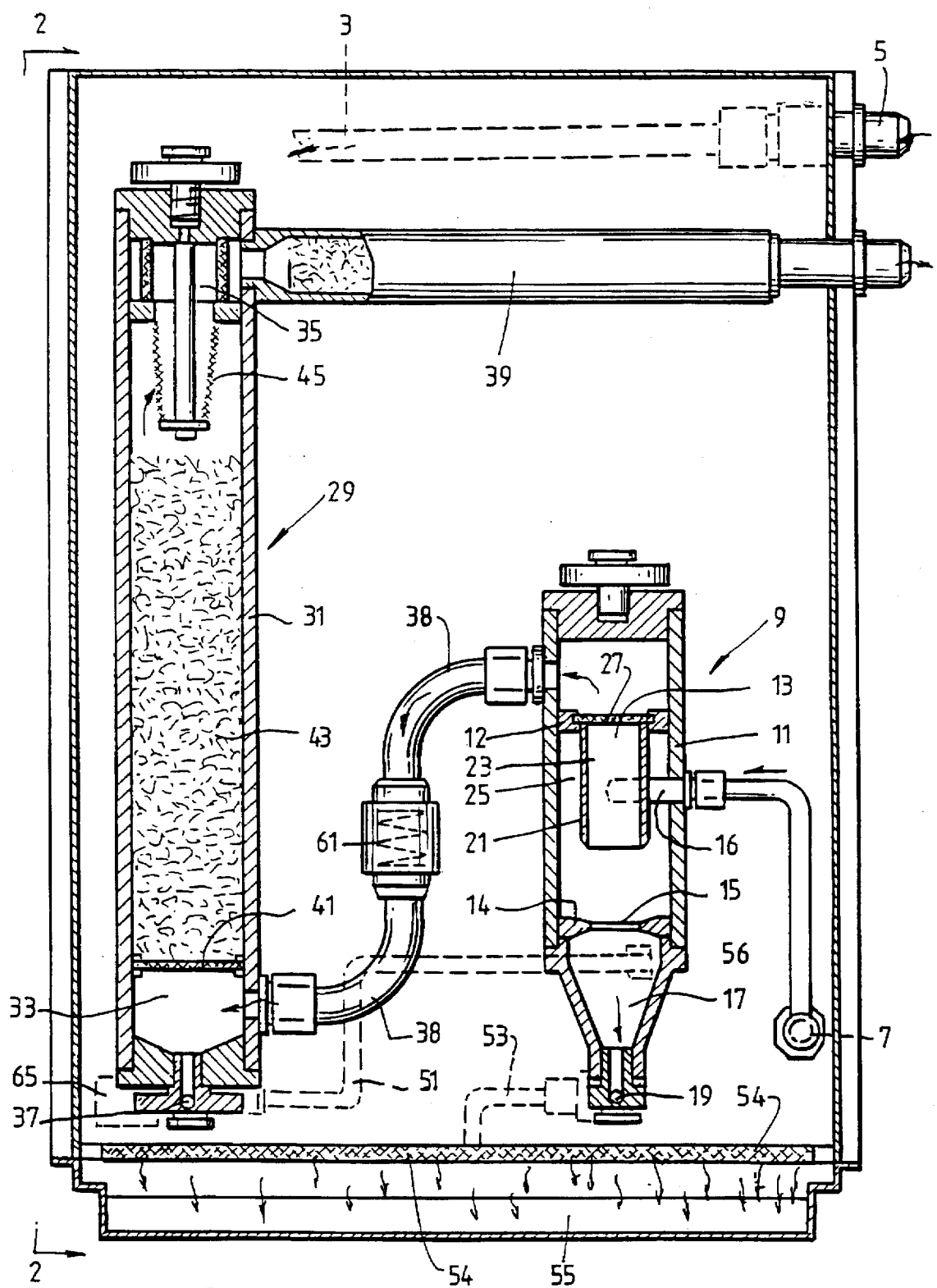

United States Patent

Bellomo

[11] Patent Number: 5,669,154
[45] Date of Patent: Sep. 23, 1997

[54] AIR DRYING AND PURIFICATION SYSTEM

[75] Inventor: Erasmo Mimmo Bellomo, Victoria, Australia

[73] Assignee: A P Systems (Australia) Pty., Ltd., Ripponiea, Australia

[21] Appl. No.: 553,335
[22] PCT Filed: May 26, 1994
[86] PCT No.: PCT/AU94/00283
  § 371 Date: Feb. 21, 1996
  § 102(e) Date: Feb. 21, 1996
[87] PCT Pub. No.: WO94/27706
  PCT Pub. Date: Dec. 8, 1994

[30] Foreign Application Priority Data

May 26, 1993 [AU] Australia .................. PL9004

[51] Int. Cl.⁶ .................................................. F26B 19/00
[52] U.S. Cl. .................................... 34/71; 34/80; 96/134
[58] Field of Search ............................. 34/58, 59, 61, 34/62, 66, 76, 79, 80, 82, 71; 96/134, 135, 136

[56] References Cited

U.S. PATENT DOCUMENTS

| | | | |
|---|---|---|---|
| 3,572,008 | 3/1971 | Hankison et al. | 95/105 |
| 3,855,719 | 12/1974 | Jonsson | 34/71 X |
| 4,018,579 | 4/1977 | Hofmann | 96/136 X |
| 4,060,913 | 12/1977 | Yoshida | 34/80 |
| 4,601,114 | 7/1986 | Noguchi | 34/62 X |
| 4,755,103 | 7/1988 | Streifinger | 415/111 |
| 5,190,569 | 3/1993 | McGrath | 96/135 |
| 5,242,473 | 9/1993 | Ogasahara | 96/125 |

FOREIGN PATENT DOCUMENTS

| | | |
|---|---|---|
| 15816/70 | 12/1971 | Australia . |
| 79061/87 | 4/1989 | Australia . |
| 302573 | 2/1989 | European Pat. Off. . |
| 380817 | 8/1990 | European Pat. Off. . |
| 2160786 | 1/1986 | United Kingdom . |

OTHER PUBLICATIONS

International Search Report; PCT/AU94/00283; 13 Jul. 1994; B. Bourke.

*Primary Examiner*—John M. Sollecito
*Assistant Examiner*—Steve Gravini
*Attorney, Agent, or Firm*—Fish & Richardson P.C.

[57] ABSTRACT

An air drying and purification system for compressed air is disclosed. The system is adapted particularly for use with dental compressors. The system comprises: (a) a centrifugal separator chamber for at least partially drying and purifying cooled compressed air from a compressor by separating moisture and other contaminants from the compressed air, (b) a drying chamber containing a bed of absorbent material for absorbing moisture from the cooled, partially dried and purified compressed air, and (c) an assembly for periodically ventilating the separator and drying chambers. A particular feature of the system is that the compressed air that is vented periodically from the drying chamber is used to cool compressed air at elevated temperatures from the compressor.

17 Claims, 2 Drawing Sheets

AIR DRYING AND PURIFICATION SYSTEM

The present invention relates to an air drying and purification system for compressed air and to a compressor incorporating the air drying and purification system.

According to the present invention there is provided an air drying and purification system for compressed air from a compressor, comprising:

(a) a centrifugal separator chamber for at least partially drying and purifying cooled compressed air from the compressor by separating moisture and entrained particulate material and other contaminants from the compressed air, the separator chamber having an inlet for compressed air and an outlet for discharging at least partially dried and purified compressed air;

(b) a drying chamber for further drying the compressed air, the drying chamber containing an absorbent material for absorbing moisture from the compressed air, the drying chamber having an inlet for introducing compressed air from the separator chamber and an outlet for discharging dried and purified compressed air; and (c) an assembly for ventilating the chambers to regenerate the absorbent material in the drying chamber and to remove contaminants from the separator chamber, the assembly comprising vent outlets in the separator chamber and the drying chamber and a valve assembly for opening and closing the vent outlets.

It is noted that the term "contaminants" may include oil vapour.

It is preferred that the air drying and purification system further comprises a heat exchanger for cooling compressed air at elevated temperatures from the compressor to condense moisture from the compressed air.

It is preferred that the heat exchanger comprise a heat exchanger coil having an inlet end for introducing compressed air at elevated temperatures from the compressor and an outlet end for discharging cooled compressed air into the separator chamber.

It is preferred that the air drying and purification system further comprises a means to direct compressed air vented from the drying chamber in heat exchange relationship with the coil.

It is preferred that the air drying and purification system further comprises a filter between the separator and drying chambers for further drying and purifying the compressed air from the separator chamber.

It is preferred that the filter be particularly adapted to remove oil vapour from the compressed air.

It is preferred that the filter be in the compressed air outlet of the separator chamber.

It is preferred that the absorbent material in the drying chamber comprises a granular molecular sieve material.

It is preferred that the air drying and purification system further comprises a filter in the compressed air inlet of the drying chamber.

It is preferred that the air drying and purification system further comprises a filter in the compressed air outlet of the drying chamber.

It is preferred that the air drying and purification system further comprises a one-way valve between the separator chamber and the drying chamber for preventing flow of compressed air from the drying chamber to the separator chamber.

It is preferred that the air drying and purification system further comprises a humidity indicator downstream of the compressed air outlet of the drying chamber.

It is preferred that the separator chamber comprises a vertically disposed cylindrical side wall and upper and lower end walls and that the inlet be in the cylindrical side wall.

With such an arrangement it is preferred that the inlet be positioned so that in use compressed air enters the separator chamber in a direction which promotes circulation of compressed air about a longitudinal axis of the separator chamber.

It is also preferred that the compressed air outlet of the separator chamber be in the upper end wall and that the vent outlet of the separator chamber be in the lower end wall.

It is also preferred particularly that the separator chamber comprises a cylindrical partition which divides the separator chamber into an outer annular section and a central cylindrical section, with the partition extending downwardly into the separator chamber from the upper end wall and terminating short of the lower end wall and being arranged so that compressed air circulates through the annular section and into the central section and therethrough to the compressed air outlet.

It is preferred that the valve assembly be a solenoid operated valve assembly.

It is preferred that the air drying and purification system further comprises one way valves in the vent outlets of the separator chamber and the drying chamber to allow compressed air to flow from but not into the separator chamber and the drying chamber.

According to the present invention there is also provided a compressor comprising:

(a) a compressor assembly for compressing air;

(b) the air drying and purification system described in the preceding paragraphs for drying and purifying the compressed air; and (c) a storage tank for storing the dried and purified compressed air.

Figure 2:
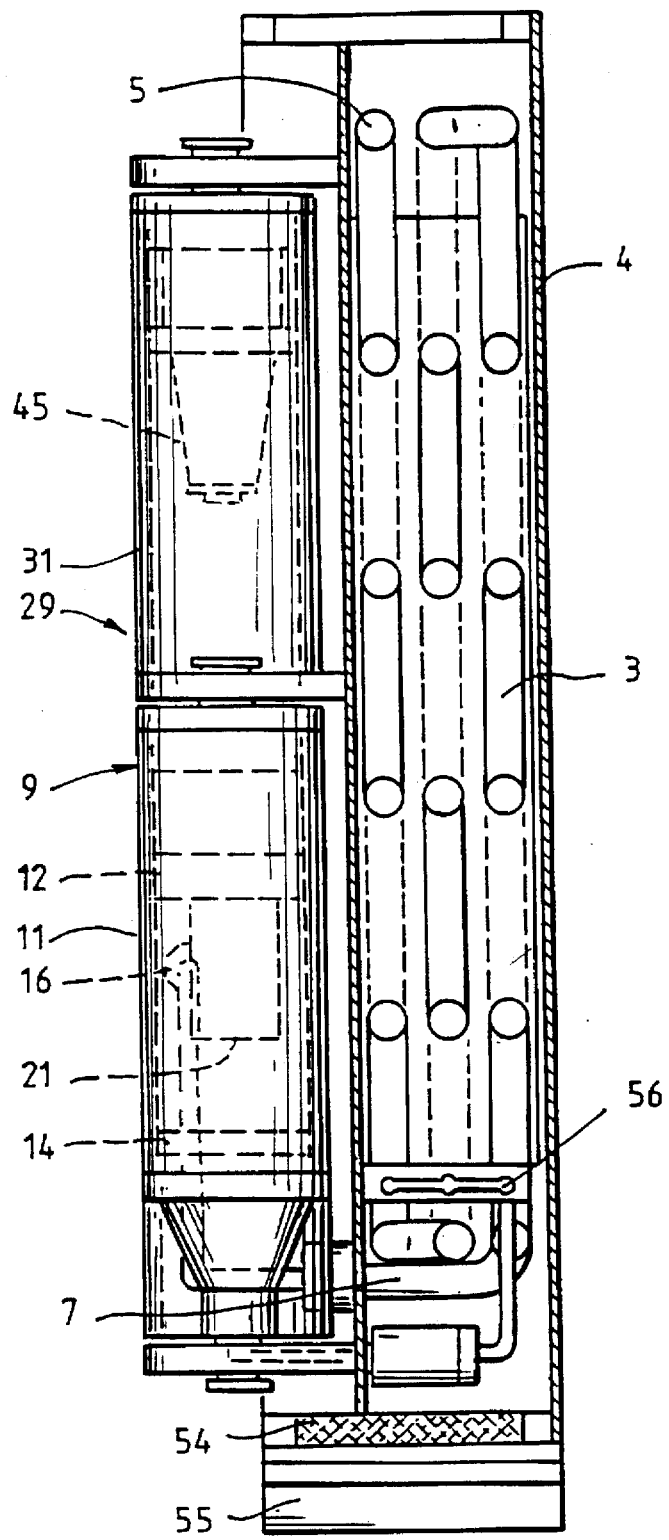

The present invention is described further by way of example with reference to the accompanying drawings in which:

FIG. 1 is a partially vertical cross-section of a preferred embodiment of an air drying and purification system in accordance with the present invention; and FIG. 2 is a partially vertical cross-section along the line 2—2 in FIG. 1.

The air drying and purification system shown in the drawings is arranged to receive compressed air from a compressor (not shown) and, after cooling, drying and purifying the compressed air, to transfer the compressed air to a storage tank (not shown). Such compressors are used widely on a commercial basis. It is noted that the present invention is not restricted to any particular type of compressor or to any particular use of compressor.

The system comprises a heat exchanger in the form of a coil 3, typically formed from a 6 meter length of 12.5 mm internal diameter copper tubing of 0.8 mm wall thickness, located in a housing 4.

The coil 3 comprises an inlet end 5 for compressed air from the compressor and an outlet end 7 for discharging cooled compressed air.

Under normal circumstances, the compressed air from the compressor is at elevated temperatures, typically 260° C., and as the compressed air flows through the tubing there is heat transfer with the copper wall of the tubing and the cooler air in the housing 4 with the result that the compressed air is cooled and moisture is condensed from the compressed air. Typically, the temperature of the compressed air at the outlet end 7 is in the order of 3° to 10° C.

As is described hereinafter, cooled compressed air that is vented periodically from the system is directed across the coil 3 to promote heat exchange with the compressed air in the coil 3.

The system further comprises a separator chamber 9 for separating moisture and entrained contaminants, such as particulate material and oil vapour, from the cooled compressed air from the coil 3.

The separator chamber 9 is defined by a vertically disposed cylindrical side wall 11, an upper end wall 12, and a lower end wall 14. The separator chamber 9 comprises an inlet 16 for cooled compressed air from the heat exchanger, an outlet 13 for at least partially dried and purified compressed air in the upper end wall 12, and an outlet 15 for moisture and contaminants separated from the compressed air in the lower end wall 14. The outlet 15 transfers the moisture and contaminants separated from the compressed air into a tapered discharge chamber 17.

The separator chamber 9 further comprises a cylindrical partition 21 which divides the separator chamber 9 into a central section 23 and an annular section 25. The partition 21 extends downwardly into the separation chamber 9 from the upper end wall 12 and terminates above the lower end wall 14.

It can readily be appreciated that cooled compressed air entering the separation chamber 9 through the inlet 16 circulates around the annular section 25 into the lower end of the central section 23 and therethrough to the compressed air outlet 13.

It can also readily be appreciated that the result of the movement of the compressed air in the annular section 25 is that moisture and entrained contaminants are forced radially outwardly and impinge against the inner surface of the cylindrical wall 11 and, over time, move down the cylindrical wall 11 and through the outlet 15 into the discharge chamber 17. As a consequence, the cooled compressed air is at least partially dried and purified.

In order to promote optimum separation conditions, namely turbulence of the compressed air in the annular section 25, the inlet 16 is arranged to direct compressed air into the annular section 25 at an angle, typically 30°, to a tangent to the cylindrical wall 11.

The system further comprises a filter 27, typically a Bronze disc filter, positioned in the compressed air outlet 13 of the separator chamber 9 to further dry and purify the compressed air. An important purpose of the filter 27 in the preferred embodiment is to remove oil vapour that may be entrained in the compressed air flowing from the separator chamber 9.

The system further comprises a drying chamber 29 for absorbing any remaining moisture retained in the compressed air.

The drying chamber 29 is defined by an essentially elongate cylindrical column 31 which has an inlet 33 at a lower end thereof and an outlet 35 at an upper end thereof. The inlet 33 in coupled by a pipe 38 to the compressed air outlet 13 of the separator chamber 25, and the outlet 35 is coupled by a pipe 39 to the storage tank (not shown). The drying chamber 29 further comprises a filter 41, typically a Bronze disc filter, adjacent the inlet 33 for further drying and purifying the compressed air, a bed 43 of granular molecular sieve material, such as Rhone-Poulenc Molecular Sieve 4A, substantially filling the cylindrical column 31, and a filter 45, typically a Bronze conical filter, adjacent the outlet 35 for filtering any molecular sieve material in powder form entrained in the compressed air.

The system further comprises a one way valve 61 in the pipe 38 for preventing reverse flow of compressed air from the drying chamber 29 to the separator chamber 9.

The system further comprises a one way valve (not shown) in the pipe 39 for preventing reverse flow of compressed air from the storage tank to the drying chamber 29.

Further, as is noted above, the system further comprises an assembly for ventilating the system periodically.

The assembly comprises an outlet 19 at a lower end of the discharge chamber 17 and an outlet 37 in the lower end of the drying chamber 29.

The assembly further comprises a discharge line 51 which connects the outlet 37 of the drying chamber 29 to the housing 4 so that cooled compressed air that is vented periodically from the drying chamber 29 is distributed via outlets 56 across the coil 3 to cool compressed air at elevated temperatures in the coil 3.

The assembly further comprises a discharge line 53 which connects the outlet 19 of the discharge chamber 17 to an elongate tube filter 54 which traps the moisture and contaminants from the separator chamber 9 and the discharge chamber 17 that are entrained in compressed air vented from these chambers. A trough 55 is positioned below the tube filter 54 to collect moisture and contaminants that drain from the tube filter 54. The compressed air flowing from the tube filter 54 vents to the atmosphere.

The assembly further comprises solenoid operated valve assemblies 65 in the discharge lines 51, 53 which are selectively operable to allow compressed air and entrained moisture and contaminants to vent from the system via the discharge lines 51, 53.

The solenoid actuated valve assemblies 65 may be responsive to the compressor motor and arranged to open periodically to ventilate the separator chamber 9 (and the discharge chamber 17) and the drying chamber 29 to atmospheric pressure when the compressor motor cuts out and thereby discharge moisture and contaminants from the system.

It is noted that the one-way valve 61 in the pipe 38 effectively isolates the drying chamber 29 from the separator chamber 9 and thus the separator chamber 9 (and the discharge chamber 17 and the cooling coil 3) is ventilated separately to the drying chamber 29.

It is also noted that the system is such that there is sufficient compressed air under pressure:

(a) in the separator chamber 9 and the cooling coil 3 to scavenge moisture and contaminants from the filter 27, the separator chamber 9, and the discharge chamber 17 through the outlet 19 and discharge line 53 when the associated solenoid actuated valve 65 is open; and (b) in the drying chamber 29 to scavenge moisture and contaminants, if any, from the drying chamber 29 and the filter 41 (including desorption of moisture from the granular molecular sieve material) through the outlet 37 and discharge line 51 when the associated solenoid actuated valve 65 is open.

Many modifications may be made to the preferred embodiment of the present invention without departing from the spirit and scope thereof.

In this regard, whilst the preferred embodiment comprises a cooling coil 3 formed from a 6 m length of 12.5 mm internal diameter copper tubing of 0.8 mm wall thickness, it can readily be appreciated that the present invention is not so limited and extends to any suitable length and diameter tubing formed from any suitable material.

Further, whilst the preferred embodiment comprises filters 27, 41 and 45 in the form of Bronze disc and conical filters, it can readily be appreciated that the present invention is not so limited and extends to any type of suitable filter.

Further, whilst the preferred embodiment comprises a bed 43 of granular molecular sieve material, it can readily be appreciated that the present invention is not so limited and extends to any suitable material for absorbing moisture from compressed air.

Further, whilst the preferred embodiment is described in the context of a compressor, an air drying and purification system downstream of the compressor, and a storage tank downstream of the air during and purification system, it can readily be appreciated that the present invention is not so limited and extends to other arrangements.

By way of example, the air drying and purification system may be located downstream of the storage tank and the solenoid actuated valve may be responsive to a timer switch or means other than the compressor motor to selectively open the outlets 19,37 to periodically vent the separator chamber 9 and the drying chamber 29.

I claim:

1. An air drying and purification system for compressed air from a compressor, comprising:
   (a) a centrifugal separator chamber for at least partially drying and purifying cooled compressed air from the compressor by separating moisture and entrained particulate material and other contaminants from the compressed air, the separator chamber having an inlet for compressed air and an outlet for discharging at least partially dried and purified compressed air;
   (b) a drying chamber for further drying the compressed air, the drying chamber containing an absorbent material for absorbing moisture from the compressed air, the drying chamber having an inlet for introducing compressed air from the separator chamber and an outlet for discharging dried and purified compressed air;
   (c) a one-way valve between the separator chamber and the drying chamber for preventing flow of compressed air from the drying chamber to the separator chamber; and
   (d) an assembly for ventilating the chambers to regenerate the absorbent material in the drying chamber and to remove contaminants from the separator chamber, the assembly comprising:
   (i) a vent outlet in the separator chamber;
   (ii) a vent outlet in the drying chamber; and
   (iii) a valve assembly for opening and closing the vent outlets.

2. The system defined in claim 1, further comprising a heat exchanger for cooling compressed air at elevated temperatures from the compressor to condense moisture from the compressed air.

3. The system defined in claim 2, wherein the heat exchanger comprises a coil having an inlet end for compressed air at elevated temperatures from the compressor and an outlet end connected to the inlet of the separator chamber for discharging cooled compressed air into the separator chamber.

4. The system defined in claim 3, further comprising a means for directing compressed air vented from the drying chamber in heat exchange relationship with the coil.

5. The system defined in claim 1 further comprising a filter between the separator chamber and the drying chamber for further drying and purifying the compressed air from the separator chamber.

6. The system defined in claim 5, wherein the filter is adapted to remove oil vapour from the compressed air.

7. The system defined in claim 6, wherein the filter is in the compressed air outlet of the separator chamber.

8. The system defined in claim 1, wherein the absorbent material in the drying chamber comprises a granular molecular sieve material.

9. The system defined in claim 8, further comprising a filter in the compressed air inlet of the drying chamber.

10. The system defined in claim 9, further comprising a filter in the compressed air outlet of the drying chamber.

11. The system defined in claim 10, further comprising a humidity indicator downstream of the compressed air outlet of the drying chamber.

12. The system defined in claim 1, wherein the separator chamber comprises a vertically disposed cylindrical side wall and upper and lower end walls and that the inlet be in the cylindrical side wall.

13. The system defined in claim 12, wherein the inlet is positioned so that in use compressed air enters the separator chamber in a direction which promotes circulation of compressed air about a longitudinal axis of the separator chamber.

14. The system defined in claim 12 or claim 13, wherein the compressed air outlet of the separator chamber is in the upper end wall and that the vent outlet of the separator chamber is in the lower end wall.

15. The system defined in claim 14, wherein the separator chamber comprises a cylindrical partition which divides the separator chamber into an outer annular section and a central cylindrical section, with the partition extending downwardly into the separator chamber from the upper end wall and terminating short of the lower end wall and being arranged so that compressed air circulates through the annular section and into the central section and therethrough to the compressed air outlet.

16. The system defined in claim 1, wherein the valve assembly is a solenoid operated valve assembly coupled to each vent outlet.

17. A compressor comprising:
   (a) a compressor assembly for compressing air;
   (b) the air drying and purification system described in claim 1 for drying and purifying the compressed air; and
   (c) a storage tank for storing the dried and purified compressed air.

* * * * *